United States Patent
Furumachi et al.

(10) Patent No.: US 9,447,838 B2
(45) Date of Patent: Sep. 20, 2016

(54) FLUID-FILLED VIBRATION DAMPING DEVICE AND METHOD OF MANUFACTURING THE SAME

(71) Applicant: SUMITOMO RIKO COMPANY LIMITED, Komaki-shi, Aichi (JP)

(72) Inventors: Naoki Furumachi, Kasugai (JP); Satoru Hibi, Ichinomiya (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 14/618,202

(22) Filed: Feb. 10, 2015

(65) Prior Publication Data

US 2015/0260254 A1 Sep. 17, 2015

(30) Foreign Application Priority Data

Mar. 17, 2014 (JP) ................................. 2014-054020

(51) Int. Cl.
*F16F 13/08* (2006.01)
*F16F 13/10* (2006.01)

(52) U.S. Cl.
CPC ............ *F16F 13/103* (2013.01); *F16F 13/105* (2013.01); *F16F 2226/045* (2013.01); *F16F 2230/30* (2013.01); *Y10T 29/49615* (2015.01)

(58) Field of Classification Search
CPC ........ F16F 13/08; F16F 13/10; F16F 13/103; F16F 2226/045
USPC ........................................ 267/140.12–140.14
See application file for complete search history.

(56) References Cited

U.S. PATENT DOCUMENTS

| | | | |
|---|---|---|---|
| 5,183,243 A | 2/1993 | Matsumoto | |
| 6,672,574 B2 * | 1/2004 | Hamada | F16F 13/1463 267/140.12 |
| 7,044,455 B2 * | 5/2006 | Yoshida | F16F 13/16 267/140.11 |
| 2002/0145240 A1 * | 10/2002 | Satori | F16F 13/108 267/140.13 |
| 2004/0188903 A1 * | 9/2004 | Goto | F16F 13/268 267/140.13 |
| 2005/0035506 A1 * | 2/2005 | de Fontenay | B60G 7/006 267/140.12 |
| 2008/0237952 A1 * | 10/2008 | Nishi | F16F 13/10 267/140.13 |
| 2011/0042873 A1 * | 2/2011 | Yamamoto | F16F 13/262 267/140.14 |
| 2012/0242019 A1 * | 9/2012 | Koyama | F16F 13/268 267/140.14 |

* cited by examiner

*Primary Examiner* — Vishal Sahni
(74) *Attorney, Agent, or Firm* — Oliff PLC

(57) ABSTRACT

A fluid-filled vibration damping device including: first and second mounting members elastically connected by a main rubber elastic body; a tubular fitting member externally slipped around the second mounting member and drawn so as to be externally fitted thereto in a fluid-tight manner; a sealing rubber layer fixed to at least one of an outer peripheral face of the second mounting member and an inner peripheral face of the tubular fitting member so as to be compressed therebetween about an entire circumference; and at least one pressure-relieving lip protruding from the sealing rubber layer and extending toward openings of the second mounting member and the tubular fitting member so as to be pressed against one of the outer peripheral face of the second mounting member and the inner peripheral face of the tubular fitting member in a direction of protrusion.

11 Claims, 4 Drawing Sheets

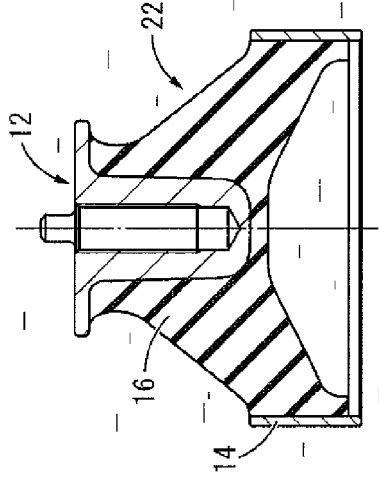

FLUID-FILLED VIBRATION DAMPING DEVICE AND METHOD OF MANUFACTURING THE SAME

INCORPORATED BY REFERENCE

The disclosure of Japanese Patent Application No. 2014-054020 filed on Mar. 17, 2014 including the specification, drawings and abstract is incorporated herein by reference in its entirety.

BACKGROUND OF THE INVENTION

1. Field of the Invention

The present invention relates to a fluid-filled vibration damping device to be used for an automotive engine mount and the like and a method of manufacturing the same.

2. Description of the Related Art

Conventionally, there has been known a vibration damping device as a kind of vibration damping coupling body or a vibration damping supporting body interposed between the members constituting a vibration transmission system to connect the members to each other in a vibration damping manner, which is applied to an automotive engine mount and the like. Also, as one type of vibration damping device, a fluid-filled vibration damping device is proposed having a non-compressible fluid sealed therein for the purpose of further improving the vibration damping performance or the like. The fluid-filled vibration damping device, as described in U.S. Pat. No. 5,183,243, for example, has a structure where a first mounting member to be mounted to one member constituting the vibration transmission system and a second mounting member to be mounted to the other member constituting the same are elastically connected to each other by a main rubber elastic body. In addition, within the fluid-filled vibration damping device, a fluid chamber is formed to keep a non-compressible fluid sealed therein so as to exert a vibration damping effect based on the flow action of the fluid and the like.

By the way, the fluid-filled vibration damping device has a fluid chamber formed between the opposing faces of the main rubber elastic body and a flexible film by means of assembling in the non-compressible fluid a vulcanization-molded product of the flexible film and a vulcanization-molded product of the main rubber elastic body. Especially in U.S. Pat. No. 5,183,243, the fluid chamber is formed by having a tubular fitting member externally fitted and fixed onto a second mounting member through a drawing operation, for example, under a condition where the tubular fitting member fixed to the outer peripheral face of the flexible film is externally slipped around the second mounting member that is fixed to the outer peripheral face of the main rubber elastic body in the non-compressible fluid.

However, when the tubular fitting member externally slipped around the outer tubular member is subjected to the drawing operation in the non-compressible fluid, the space between the second mounting member and the tubular fitting member is closed with a sealing rubber layer in the initial stage of the drawing operation when the fixing force between the second mounting member and the tubular fitting member is still small. As a result, the internal pressure of the fluid chamber rises as the amount of diameter-constricting deformation of the tubular fitting member by the drawing thereof is increased, which poses a risk of tilting the second mounting member against the tubular fitting member or generating a positional deviation between them in the direction of detaching from each other during the assembly.

In assembling the tubular fitting member to the second mounting member by drawing, a jig is attached to restrain the flexible film to limit its deformation in order to properly set the amount of fluid sealed in the fluid chamber, so that no effect of liquid-pressure compensation due to deformation of the flexible film can be exerted. Also, when the assembly of the tubular fitting member to the second mounting member is performed without restraining the flexible film with a jig, the internal pressure rise of the fluid chamber is mitigated, while the amount of fluid sealed therein is varied to make it difficult to obtain the intended vibration damping performance in a stable manner.

SUMMARY OF THE INVENTION

The present invention was made against the background described above, and the problems to be solved are to provide a fluid-filled vibration damping device with a novel structure capable of obtaining the intended vibration damping performance, durability and so forth in a stable manner by means of stably keeping a given amount of non-compressible fluid sealed in the fluid chamber while assembling a second mounting member and a tubular fitting member at a given relative position, and to provide a method of manufacturing the same.

Aspects of the present invention made to solve such problems are described below. The components used in each of the following aspects can be adopted in any combination as possible.

A first aspect of the present invention is a fluid-filled vibration damping device comprising: a first mounting member; a tubular second mounting member; a main rubber elastic body elastically connecting the first and second mounting members; a tubular fitting member externally slipped around the second mounting member that is fixed to an outer peripheral face of the main rubber elastic body, the tubular fitting member being drawn (by a drawing operation) and externally fitted onto the second mounting member in a fluid-tight manner so as to provide a fluid chamber whose wall is partially constituted by the main rubber elastic body and which is filled with a non-compressible fluid; a sealing rubber layer fixed to at least one of an outer peripheral face of the second mounting member and an inner peripheral face of the tubular fitting member so as to be compressed between the second mounting member and the tubular fitting member about an entire circumference; and at least one pressure-relieving lip protruding from the sealing rubber layer and extending toward openings of the second mounting member and the tubular fitting member so as to be pressed against one of the outer peripheral face of the second mounting member and the inner peripheral face of the tubular fitting member in a direction of protrusion.

In the fluid-filled vibration damping device with a structure according to the first aspect described above, the sealing rubber layer is depressed on both sides of the pressure-relieving lip by having it pressed against either the outer peripheral face of the second mounting member or the inner peripheral face of the tubular fitting member during the drawing operation of the tubular fitting member in the non-compressible fluid. This allows the fluid chamber to be communicated with the outside through the depressed portion of the sealing rubber layer in the initial stage of the drawing operation to drain the non-compressible fluid in the fluid chamber to the outside through the depressed portion of the sealing rubber layer, thus preventing the internal pressure of the fluid chamber from rising. As a result, relative tilting of the second mounting member against the tubular fitting member and positional deviation between them in the axial direction due to the internal pressure rise can be avoided in the initial stage of the drawing operation when the fixing force between the second mounting member and the tubular fitting member is still small.

Further, due to the increased amount of diameter constriction of the tubular fitting member as the drawing operation thereof proceeds, the second mounting member and the tubular fitting member are positioned by a larger fixing force, while the sealing rubber layer is compressed between the second mounting member and the tubular fitting member to close the space between them with the sealing rubber layer in a fluid-tight manner. This allows the fluid chamber to be completely closed from the outside in a fluid-tight manner to keep an appropriate amount of non-compressible fluid sealed in the fluid chamber.

A second aspect of the present invention provides the fluid-filled vibration damping device according to the first aspect, wherein the at least one pressure-relieving lip comprises a plurality of pressure-relieving lips, and the pressure-relieving lips are arranged at a given distance from each other in a circumferential direction of the second mounting member and the tubular fitting member.

According to the second aspect, by having the pressure-relieving lip pressed against either the second mounting member or the tubular fitting member at multiple locations along the circumference, the elastic force of the pressure-relieving lip is exerted dispersedly on the second mounting member and the tubular fitting member along the circumference, thus avoiding relative tilting and the like between the second mounting member and the tubular fitting member.

A third aspect of the present invention provides the fluid-filled vibration damping device according to the first or second aspect, wherein the pressure-relieving lip extends straightly in a direction of external slip of the tubular fitting member around the second mounting member.

According to the third aspect, since the pressure-relieving lip extends straightly without tilting in the circumferential direction, the depressed portion of the sealing rubber layer formed along the pressure-relieving lip similarly extends straightly in the direction of the external slip, which enables to efficiently generate a fluid flow through the depressed portion. Therefore, the internal pressure fluctuation of the fluid chamber caused by the increase in the amount of diameter-constricting deformation of the tubular fitting member is reduced more effectively, thus preventing any positional deviation between the second mounting member and the tubular fitting member.

A fourth aspect of the present invention provides the fluid-filled vibration damping device according to any one of the first to third aspects, further comprising an annular-shape seal lip protruding from the sealing rubber layer and extending in a circumferential direction of the second mounting member and the tubular fitting member.

According to the fourth aspect, by having the annular-shape seal lip pressed against either the second mounting member or the tubular fitting member, the space between the second mounting member and the tubular fitting member is closed more effectively. Especially by the pressing of the seal lip, the fluid tightness is secured between the second mounting member and the tubular fitting member, which renders it unnecessary to constrict the tubular fitting member in diameter until the depressed portion of the sealing rubber layer is eliminated, which enables to set the amount of diameter-constricting deformation of the tubular fitting member at a relatively low level.

A fifth aspect of the present invention provides the fluid-filled vibration damping device according to any one of the first to fourth aspects, further comprising: a flexible film that closes the opening of the tubular fitting member fluid-tightly so as to provide the fluid chamber between the main rubber elastic body and the flexible film; a partition member arranged in the fluid chamber to have its outer peripheral face supported by the tubular fitting member, the fluid chamber being divided into two parts by the partition member so as to form a pressure-receiving chamber whose wall is partially constituted by the main rubber elastic body and an equilibrium chamber whose wall is partially constituted by the flexible film respectively on both sides across the partition member; and an orifice passage that interconnects the pressure-receiving chamber and the equilibrium chamber.

According to the fifth aspect, excellent vibration damping performance can be obtained due to the flow action of the fluid flowing through the orifice passage. In addition, by constricting the tubular fitting member in diameter through the drawing operation, the tubular fitting member is externally fitted onto the second mounting member while being capable of supporting the outer peripheral face of the partition member with the tubular fitting member, which enables to manufacture the device more easily with a limited number of processes.

A sixth aspect of the present invention provides a method of manufacturing a fluid-filled vibration damping device comprising: a main rubber body forming process in which a first mounting member and a second mounting member prepared in advance are elastically connected by a main rubber elastic body to obtain an integrally vulcanization molded component of the main rubber elastic body incorporating the first and second mounting members; a sealing rubber forming process in which a sealing rubber layer is formed so as to cover at least one of an outer peripheral face of the second mounting member and an inner peripheral face of a tubular fitting member prepared in advance, the sealing rubber layer being provided with a pressure-relieving lip protruding therefrom and extending toward openings of the second mounting member and the tubular fitting member; an assembly process in which the tubular fitting member is externally slipped around the second mounting member of the integrally vulcanization molded component of the main rubber elastic body and subjected to a drawing operation within a non-compressible fluid so as to provide a fluid chamber with the non-compressible fluid sealed therein, and the tubular fitting member is externally fitted onto the second mounting member while the pressure-relieving lip is pressed against one of the second mounting member and the tubular fitting member in a direction of protrusion so that the sealing rubber layer is depressed on both sides of the pressure-relieving lip and the fluid chamber communicates with an outside; and a sealing process in which the tubular fitting member is further constricted in diameter and the sealing rubber layer is compressed between the second mounting member and the tubular fitting member so as to provide a fluid-tight sealing between superposed faces of the second mounting member and tubular fitting member to completely close the fluid chamber.

With the method of manufacturing the fluid-filled vibration damping device according to the sixth aspect, by pressing the pressure-relieving lip formed on and protruding from the sealing rubber layer against either the second mounting member or the tubular fitting member in the assembly process, the sealing rubber layer is depressed on both sides of the pressure-relieving lip to let the fluid chamber communicate with the outside at the depressed portion of the sealing rubber layer. Therefore, in the assembly process, the internal pressure rise of the fluid chamber due to the diameter-constricting deformation of the tubular fitting member is mitigated, thus preventing any positional deviation between the second mounting member and the tubular fitting member.

Also in the sealing process, by compressing the sealing rubber layer between the second mounting member and the tubular fitting member, the space between the second mounting member and the tubular fitting member is sealed fluid-tightly to cancel the communication between the fluid chamber and the outside due to the depressed portion of the sealing rubber layer. This allows the fluid chamber to keep an appropriate amount of non-compressible fluid sealed therein, which enables to obtain the intended vibration damping effect.

A seventh aspect of the present invention provides the method of manufacturing the fluid-filled vibration damping device according to the sixth aspect, wherein, in the assembly process, the tubular fitting member having a tapered tubular shape that expands toward one open end is externally slipped around the second mounting member that extends straightly in a tubular shape from a side of the one open end.

According to the seventh aspect, because of the tapered tubular shape, the tubular fitting member can easily be externally slipped around the second mounting member extending straightly due to the guiding effect of the inner peripheral face of the tapered tubular portion, making the assembly process easier in the non-compressible fluid.

According to the present invention, the pressure-relieving lip is formed protruding out of the sealing rubber layer, which is depressed on both sides of the pressure-relieving lip by having it pressed against either the second mounting member or the tubular fitting member in the initial stage of the drawing operation applied to the tubular fitting member. This allows the fluid chamber to communicate with the outside through the depressed portion of the sealing rubber layer, so that the internal pressure rise of the fluid chamber caused by the diameter-constricting deformation of the tubular fitting member or the like is mitigated, whereby preventing relative tilting and positional deviation between the second mounting member and the tubular fitting member. In addition, since the tubular fitting member undergoes enough diameter-constricting deformation once the drawing operation is completed, the sealing rubber layer is compressed between the second mounting member and the tubular fitting member, closing the space between them in a fluid-tight manner. Therefore, even if the depressed portion is formed on the sealing rubber layer in the initial stage of the drawing operation, the non-compressible fluid sealed in the fluid chamber does not leak out through the space between the second mounting member and the tubular fitting member once the drawing operation is complete, and the intended vibration damping performance can be obtained in a stable manner by keeping an appropriate amount of non-compressible fluid sealed in the fluid chamber.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIGS. 4A-4C are vertical cross sectional views suitable for explaining a manufacturing process of the engine mount shown in FIG. 1.

DETAILED DESCRIPTION OF PREFERRED EMBODIMENTS

Embodiments of the present invention will be described below in reference to the drawings.

Figure 1:
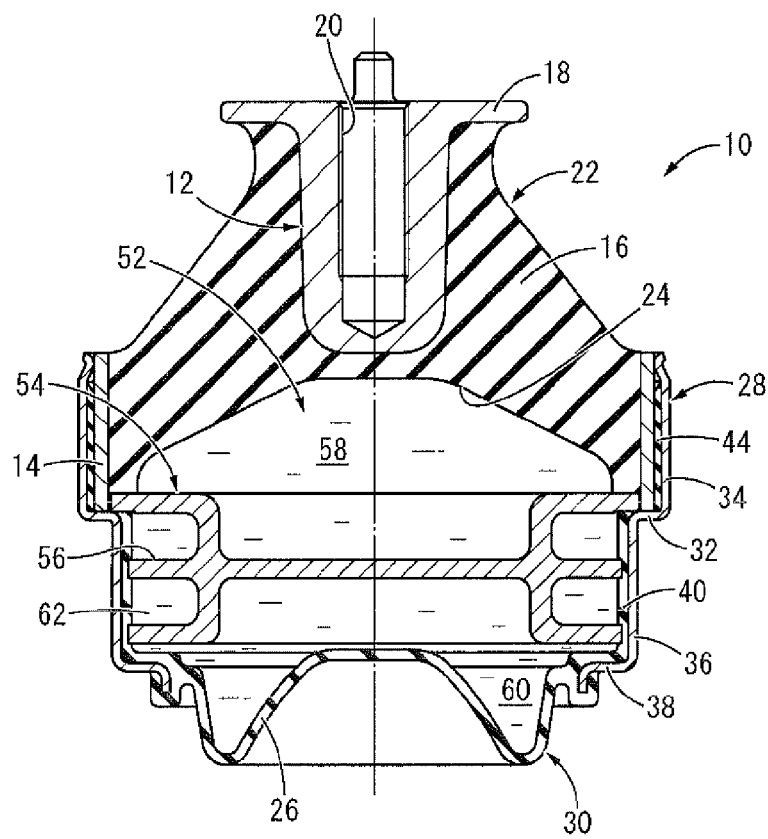
FIG. 1 is a vertical cross sectional view of a fluid-filled vibration damping device in the form of an engine mount as a first embodiment of the present invention.

FIG. 1 shows an automotive engine mount 10 as one embodiment of the fluid-filled vibration damping device with the structure according to the present invention. The engine mount 10 has a structure where a first mounting member 12 and a second mounting member 14 are elastically connected to each other by a main rubber elastic body 16. In the following descriptions, "up-down direction" means the up and down direction in FIG. 1, which is an approximately vertical direction in a state of being mounted to a vehicle.

More specifically, the first mounting member 12 is a high-rigidity member formed of metal, synthetic resin or the like in an approximate shape of a cylinder as a whole where a flange 18 is integrally formed at the top end protruding toward the outer periphery. In addition, in the first mounting member 12, a screw hole 20 is formed to extend in the up-down direction along the central axis to open to the top face thereof. The first mounting member 12 is mounted to a power unit (not shown) with a fixing bolt (not shown) to be screwed into the screw hole 20.

The second mounting member 14 is a high-rigidity member as is the first mounting member 12, and is made in an approximate shape of a thin and large-diameter cylinder extending straightly with almost a constant cross-section. Then, the first mounting member 12 is arranged at the upper opening of the second mounting member 14 on nearly the same central axis, and the first mounting member 12 and the second mounting member 14 are elastically connected to each other by the main rubber elastic body 16.

The main rubber elastic body 16 is in an approximate shape of a thick and large-diameter truncated cone where the first mounting member 12 is bonded by vulcanization to the small-diameter end thereof, while the second mounting member 14 is bonded by vulcanization to the outer peripheral face of the large-diameter end thereof. The main rubber elastic body 16 is formed as an integrally vulcanization molded component 22 incorporating the first mounting member 12 and the second mounting member 14.

Also, in the main rubber elastic body 16, a large-diameter recess 24 is formed opening to the end face thereof on the larger-diameter side. The large-diameter recess 24 is in an approximate shape of an inverted bowl expanding downward, and its bottom face is formed in a depth not reaching the first mounting member 12.

Figure 2:
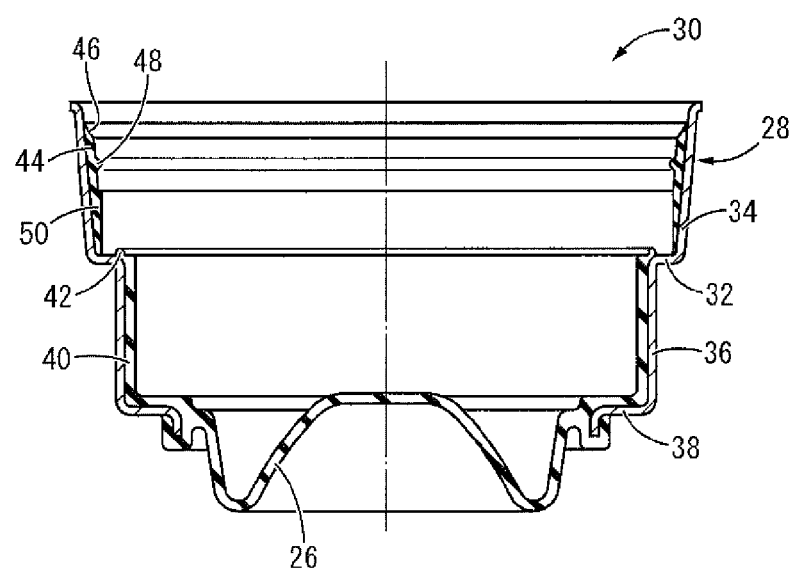
FIG. 2 is a vertical cross sectional view of an integrally vulcanization molded component of a flexible film constituting the engine mount shown in FIG. 1, taken along line 2-2 of FIG. 3.
Figure 3:
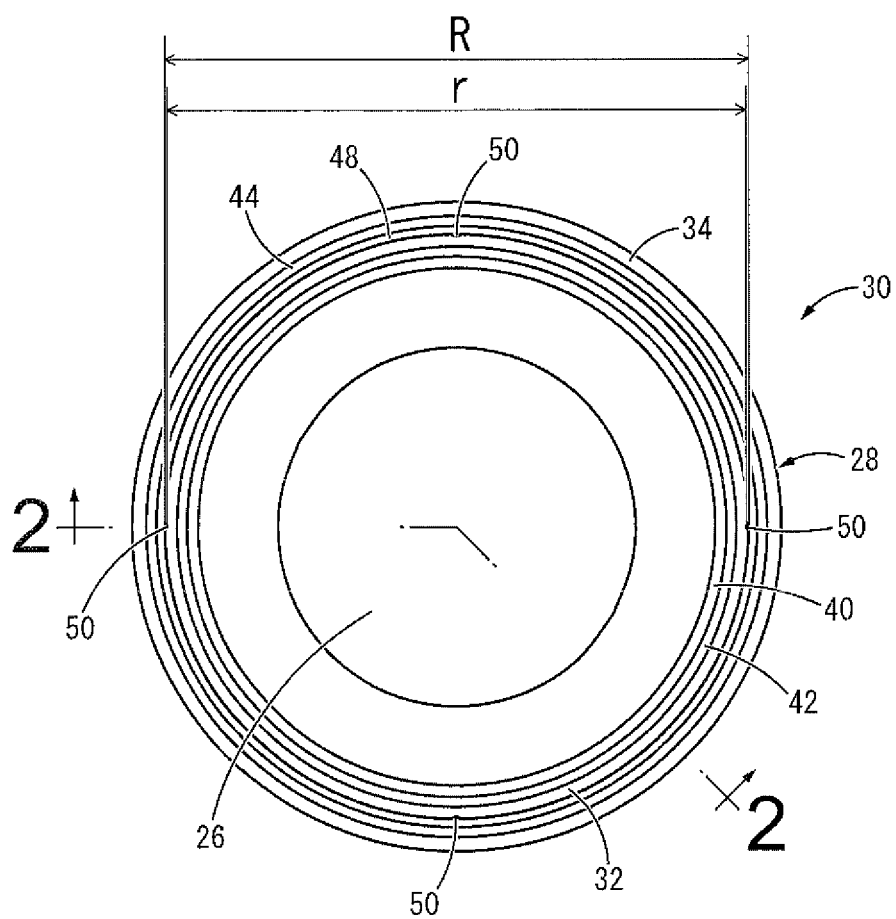
FIG. 3 a plan view of the integrally vulcanization molded component of the flexible film shown in FIG. 2.

Also, the second mounting member 14 is provided with a flexible film 26 attached thereto. The flexible film 26, as shown in FIGS. 2 and 3, is formed of a thin and large-diameter rubber membrane provided with enough slack in the up-down direction. To the outer peripheral end of the flexible film 26, a tubular fitting member 28 is bonded by vulcanization. The flexible film 26 is formed as an integrally vulcanization molded component 30 provided with the tubular fitting member 28.

The tubular fitting member 28 is in an approximate shape of a thin and large-diameter cylinder with an annular-shape step portion 32 formed in the middle in the axial direction, upper part of which is made into a fitting portion 34 with large diameter, while the lower part of the step portion 32 is made into a small-diameter support portion 36. The fitting portion 34 is in a tapered tubular shape that expands toward the upper opening, and extends upward from the outer peripheral end of the step portion 32. The support portion 36 is in an approximate shape of a cylinder extending straightly with almost a constant cross-section, extending downward from the inner peripheral end of the step portion 32. In addition, at the bottom end of the support portion 36, a fixing portion 38 in an inner flange shape protruding peripherally inward is formed continuously about the entire circumference, and the lower opening of the tubular fitting member 28 is closed fluid-tightly by the flexible film 26 by having the fixing portion 38 bonded by vulcanization to the outer peripheral end of the flexible film 26.

In addition, a bunging rubber layer 40 is fixed to the support portion 36 of the tubular fitting member 28. The bunging rubber layer 40 is integrally formed with the flexible film 26 and arranged to cover almost entirely the inner peripheral face of the support portion 36. At the top end of the bunging rubber layer 40, an annular-shape bunging protrusion 42 is integrally formed and protrudes upward, which is fixed to the inner peripheral edge of the top face of the step portion 32.

Also, a sealing rubber layer 44 is fixed to the fitting portion 34 of the tubular fitting member 28. The sealing rubber layer 44 is formed of a rubber elastic body in an approximate shape of a thin and large-diameter cylinder and arranged to cover the inner peripheral face of the fitting portion 34 from the middle portion all the way to the bottom end in the axial direction. Also, the sealing rubber layer 44 has its outer peripheral face tapered throughout the entirety corresponding to the inner peripheral face of the fitting portion 34, while the inner peripheral face of its upper portion is tapered corresponding to the outer peripheral face, whereas the inner peripheral face of its lower portion is made into a cylinder face extending in the up-down direction with almost a constant diameter. This causes the lower portion of the sealing rubber layer 44 to gradually thin out toward the bottom. The top face of the sealing rubber layer 44 is made into a guiding face 46 in a tapered shape sloping inward.

In addition, an annular-shape seal lip 48 is formed on the sealing rubber layer 44 to protrude therefrom. The seal lip 48 is a protrusion protruding from the inner peripheral face of the sealing rubber layer 44 inward in the radial direction, which extends continuously with almost a constant semicircular cross-section about the entire circumference in the circumferential direction.

Under these circumstances, a pressure-relieving lip 50 is formed on the sealing rubber layer 44 to protrude therefrom. The pressure-relieving lip 50 protrudes radially inward from the inner peripheral face of the sealing rubber layer 44 with the integrally vulcanization molded component 30 of the flexible film 26 in isolation as shown in FIGS. 2 and 3, and extends toward the opening of the tubular fitting member 28. The pressure-relieving lip 50 of the present embodiment extends straightly in the direction of external slip of the tubular fitting member 28 around the second mounting member 14 to be explained later (in the axial direction) without tilting in the circumferential direction. Also, on the sealing rubber layer 44, four of the pressure-relieving lips 50 are formed at a given distance from each other in the circumferential direction, and in the present embodiment, these pressure-relieving lips 50 are arranged in nearly equal distribution in the circumferential direction of the sealing rubber layer 44.

Further, the pressure-relieving lip 50 has its protrusion tip extended in the up-down direction at almost a constant radial position all along its length, and its protrusion height from the sealing rubber layer 44 gradually increases upward. Moreover, the diameter (r) of a virtual circle passing through the protrusion tip of the pressure-relieving lip 50 is made smaller than the diameter (R) of the protrusion tip of the seal lip 48, so that the pressure-relieving lip 50 protrudes further inward than the seal lip 48. The pressure-relieving lip 50 is integrally formed with the seal lip 48 via the sealing rubber layer 44 and arranged below the seal lip 48 at a given distance.

The pressure-relieving lip 50 of the present embodiment is gradually narrowed in the circumferential (width) direction toward the protrusion tip thereof, while the ratio (h/w) of its protrusion height (h) to width (w) is preferably set in the range of $0.5 \leq h/w \leq 1.5$. The minimum value ($h_{min}$) of the protrusion height of the pressure-relieving lip 50 is preferably set at not less than 0.5 mm, and more preferably at 1.0 mm or more. This allows a pressure-relieving groove 64 described later to be formed more stably with a large enough cross-sectional area.

Then, the second mounting member 14 is inserted into the fitting portion 34 of the tubular fitting member 28, and the fitting portion 34 externally slipped around the second mounting member 14 is externally fitted onto the second mounting member 14 by being constricted in diameter using a drawing operation such as all-direction drawing. In the present embodiment, the amount of diameter-constricting deformation of the fitting portion 34 is gradually increased upward, and in a state of being externally fitted onto the second mounting member 14, the fitting portion 34 is made in an approximate shape of a cylinder extending in the axial direction with almost a constant cross-section (see FIG. 1). For example, the second mounting member 14 can be mounted to a vehicular body by means of mounting an outer bracket (not shown) that is externally fitted and fixed to the fitting portion 34 of the tubular fitting member 28 to the vehicular body (not shown).

Also, the sealing rubber layer 44 fixed to the inner peripheral face of the fitting portion 34 is compressed between the second mounting member 14 and the fitting portion 34 about the entire circumference, thereby providing a fluid-tight sealing between the superposed faces of the second mounting member 14 and the fitting portion 34. In addition, the seal lip 48 and the pressure-relieving lip 50 integrally formed with the sealing rubber layer 44 are each pressed against the outer peripheral face of the second mounting member 14 in the direction of protrusion to be compressed in the direction of protrusion.

This allows the integrally vulcanization molded component 22 of the main rubber elastic body 16 and the integrally vulcanization molded component 30 of the flexible film 26 to be assembled to each other, and a fluid chamber 52 having a non-compressible fluid sealed therein is formed between the main rubber elastic body 16 and the flexible film 26. The non-compressible fluid to be sealed in the fluid chamber 52 is not particularly limited, but for example, water, ethylene glycol, alkylene glycol, polyalkylene glycol, silicone oil, or a mixture liquid thereof and the like can be adopted. Further, a fluid of low viscosity at 0.1 Pa·s or less is preferably used in order to efficiently obtain the vibration damping effect based on the fluid flow action described later.

Also, a partition member 54 is arranged in the fluid chamber 52. The partition member 54 is a hard member formed of metal or synthetic resin in an approximate shape of a disc with a peripheral groove 56 being formed along the outer peripheral portion extending in the circumferential direction for a little less than two rounds opening toward the outer periphery. Then, the partition member 54 has its outer peripheral face pressed against and supported by the support portion 36 of the tubular fitting member 28 via the bunging rubber layer 40, while having the outer periphery of its upper end held between the step portion 32 of the tubular fitting member 28 and the bottom face of the outer peripheral end of the main rubber elastic body 16. In this way, the partition member 54 is mounted to the second mounting member 14 via the tubular fitting member 28.

Also, the partition member 54 is arranged to extend approximately in the axis-perpendicular direction within the fluid chamber 52, which is vertically divided into two parts across the partition member 54. This forms a pressure-receiving chamber 58 whose wall is partially constituted by the main rubber elastic body 16 above the partition member 54 of the fluid chamber 52 where internal pressure fluctuation is caused at the time of vibration input. Meanwhile, below the partition member 54, formed is an equilibrium chamber 60 whose wall is partially constituted by the flexible film 26 and that allows volume changes therein. In each of the pressure-receiving chamber 58 and the equilibrium chamber 60, the non-compressible fluid contained in the fluid chamber 52 is sealed in.

Also, by the outer peripheral face of the partition member 54 being superposed against the support portion 36 of the tubular fitting member 28, the outer peripheral opening of the peripheral groove 56 is covered with the support portion 36, while an orifice passage 62 is formed to interconnect the pressure-receiving chamber 58 and the equilibrium chamber 60 using the peripheral groove 56 by means of having two ends of the peripheral groove 56 respectively communicated with the pressure-receiving chamber 58 and the equilibrium chamber 60. The tuning frequency of the orifice passage 62 of the present embodiment (resonant frequency of the fluid flowing through the orifice passage 62) is adjusted at a low frequency around 10 Hz equivalent to that of engine shake by properly setting the ratio (A/L) of the passage cross-sectional area (A) to the passage length (L).

The engine mount 10 with the structure described above is mounted to a vehicle by having the first mounting member 12 mounted to a power unit (not shown) and the second mounting member 14 mounted to a vehicular body (not shown). Then, once a low-frequency, large-amplitude vibration equivalent to that of engine shake is inputted across the first mounting member 12 and second mounting member 14, a fluid flow is caused via the orifice passage 62 based on the relative pressure fluctuation between the pressure-receiving chamber 58 and the equilibrium chamber 60, thus exerting the vibration damping effect based on the flow action of the fluid.

Meanwhile, in the engine mount 10, the amount of non-compressible fluid to be sealed in the pressure-receiving chamber 58 and the equilibrium chamber 60 is properly set so as to obtain the intended vibration damping effect in a stable manner. An example of manufacturing method of the engine mount 10 relating to the present embodiment will be described below.

First, the integrally vulcanization molded component 22 of the main rubber elastic body 16 incorporating the first mounting member 12 and the second mounting member 14 is obtained by setting them prepared in advance in a mold for molding the main rubber elastic body 16 (not shown) and forming the main rubber elastic body 16 by vulcanization. This completes the main rubber body forming process. The means for obtaining the first mounting member 12 and the second mounting member 14 is not particularly limited, but for example, the first mounting member 12 can be formed by casting, and the second mounting member 14 can be formed by extrusion.

Also, the integrally vulcanization molded component 30 of the flexible film 26 provided with the tubular fitting member 28 is obtained by means of setting the tubular fitting member 28 prepared in advance in the metal mold (not shown) of the flexible film 26 for molding it by vulcanization. This completes the flexible film forming process. The means for obtaining the tubular fitting member 28 is not particularly limited, but for example, it can be obtained by processing a cylindrical metal material into a prescribed shape by press working.

Further, in the flexible film forming process in the present embodiment, the bunging rubber layer 40 provided with the bunging protrusion 42 and the sealing rubber layer 44 provided with the seal lip 48 and the pressure-relieving lip 50 are vulcanization-molded on the inner peripheral face of the tubular fitting member 28 at the same time as forming the flexible film 26. That is, the bunging rubber layer 40 is integrally formed in the same process as that of the flexible film 26, while the sealing rubber layer 44 is formed separately from, but in the same process as the flexible film 26 and the bunging rubber layer 40. In the present embodiment, the flexible film 26, the bunging rubber layer 40 and the sealing rubber layer 44 are formed of the same rubber material using the same mold. This completes the sealing rubber forming process and the flexible film forming process as a single process in the present embodiment.

Next, as shown in FIGS. 4A and 4B, the integrally vulcanization molded component 22 of the main rubber elastic body 16, the integrally vulcanization molded component 30 of the flexible film 26, and the partition member 54 prepared in advance are assembled to each other in a water tank filled with a non-compressible fluid. That is, as shown in FIG. 4A, the integrally vulcanization molded components 22, 30 and the partition member 54 are placed in the non-compressible fluid and, as shown in FIG. 4B, the partition member 54 is inserted into the support portion 36 of the tubular fitting member 28 in the integrally vulcanization molded component 30 of the flexible film 26, while the integrally vulcanization molded component 22 of the main rubber elastic body 16 is inserted into the fitting portion 34 of the tubular fitting member 28 from above to externally slip the fitting portion 34 around the second mounting member 14. By having the insertion tip of the second mounting member 14 abutted against the top face of the step portion 32 of the tubular fitting member 28, the second mounting member 14 is inserted into the tubular fitting member 28 up to a given position in the axial direction. In the present embodiment, since the fitting portion 34 of the tubular fitting member 28 is made in a tapered tubular shape that expands toward the upper opening of the fitting portion 34, which is made larger enough than the outline of the second mounting member 14, the second mounting member 14 can easily be inserted into the upper opening of the fitting portion 34.

Then, the engine mount 10 is formed, as shown in FIG. 4C, by subjecting the fitting portion 34 externally slipped around the second mounting member 14 to a drawing operation such as all-direction drawing and pressing the fitting portion 34 against the outer peripheral face of the second mounting member 14 and fixing it in place. As shown in FIG. 4B, during the assembly of the second mounting member 14 and the tubular fitting member 28 through the drawing operation of the tubular fitting member 28, a jig 63 is superposed against the bottom face of the flexible film 26 to limit the amount of deformation thereof.

Under these circumstances, by having the fitting portion 34 externally fitted onto the second mounting member 14, the space between the superposed faces of the second mounting member 14 and the fitting portion 34 is sealed with the sealing rubber layer 44, but in the initial stage of the drawing operation when the amount of diameter-constricting deformation of the fitting portion 34 is still small, the fluid chamber 52 can be communicated with the outside through the space between the superposed faces of the second mounting member 14 and the fitting portion 34.

Figure 5A:
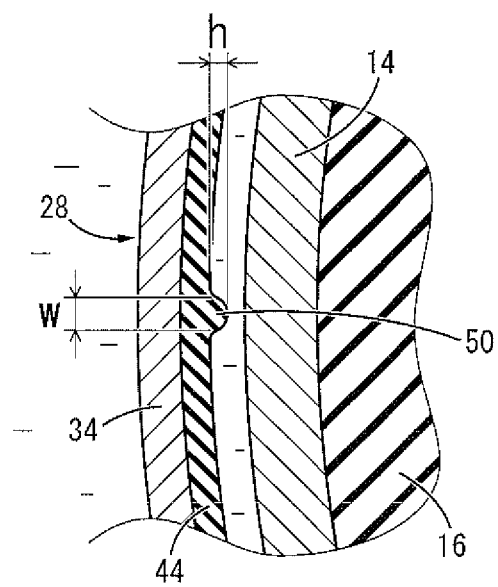
FIGS. 5A and 5B are enlarged transverse cross sectional views of a principle part of the engine mount shown in FIG. 1 suitable for explaining a manufacturing process thereof, where FIG. 5A indicates a tubular fitting member before a drawing operation and FIG. 5B indicates the same in the initial stage of the drawing operation.
Figure 5B:
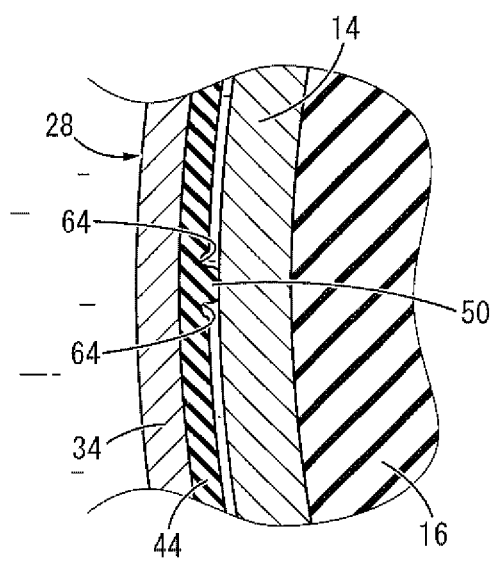

That is, as shown in FIG. 5A, once the fitting portion 34 is constricted in diameter by the drawing operation while being externally slipped around the second mounting member 14 so that the pressure-relieving lip 50 protruding from the sealing rubber layer 44 is pressed against the outer peripheral face of the second mounting member 14, the sealing rubber layer 44 is depressed on both sides of the pressure-relieving lip 50 in the width direction (circumferential direction of the sealing rubber layer 44), as shown in FIG. 5B. This allows the pressure-relieving groove 64 that opens to the inner peripheral face of the sealing rubber layer 44 to be formed to extend along the pressure-relieving lip 50. As a result, the second mounting member 14 and the tubular fitting member 28 are temporarily fixed to each other in a state where the space between the opposing faces of the main rubber elastic body 16 and the flexible film 26 (fluid chamber 52) communicates with the outside through the pressure-relieving groove 64 at the upper opening of the fitting portion 34, which completes the assembly process. Thus, in the assembly process whereby the tubular fitting member 28 is externally fitted onto the second mounting member 14 in a state of temporary fix, by preventing the fluid chamber 52 from being completely closed, the rise in the internal pressure of the fluid chamber 52 is avoided in the initial stage of the drawing operation when the amount of diameter-constricting deformation of the fitting portion 34 is still small.

In the area from the middle to the bottom end of the sealing rubber layer 44 in the axial direction where the pressure-relieving lip 50 is formed, the minimum thickness of the sealing rubber layer 44 is preferably set at 1.0 mm or more, and more preferably at 2.0 mm or more, which allows the pressure-relieving groove 64 to be formed in a stable manner with a large enough cross-sectional area.

In addition, the space between the second mounting member 14 and the fitting portion 34 is sealed fluid-tightly by means of furthering the diameter-constricting deformation of the fitting portion 34 by the drawing operation so as to constrict the fitting portion 34 in diameter until the sealing rubber layer 44 and the seal lip 48 are compressed enough between the second mounting member 14 and the fitting portion 34. This completes the sealing process whereby the fluid chamber 52 is configured fluid-tightly and a given amount of non-compressible fluid is sealed therein.

The above completes the manufacturing process of the engine mount 10 in the present embodiment by completing the assembly process in the initial stage of the drawing operation and the sealing process upon completion of the drawing operation as a single drawing process.

Also, in the present embodiment, by subjecting the entire tubular fitting member 28 to the drawing operation for diameter constriction, the support portion 36 of the tubular fitting member 28 is pressed against the outer peripheral face of the partition member 54 via the bunging rubber layer 40 to close the outer peripheral opening of the peripheral groove 56 in a fluid-tight manner. This allows the pressure-receiving chamber 58 and the equilibrium chamber 60 to be configured on both sides of the partition member 54 and the orifice passage 62 to be formed to interconnect both chambers.

The drawing operation applied to the tubular fitting member 28 is not particularly limited to the all-direction drawing using a multiple division pattern along the circumference or the like, but various publicly known means can be adopted such as drawing operation by press-fitting the fitting portion 34 in a single tubular mold or by pressing a roller against the outer peripheral face of the fitting portion 34. Also, in the present embodiment, it is desirable to apply drawing operation to the fitting portion 34 from the bottom toward the top. This is because, in the initial stage of the drawing operation, the seal lip 48 provided above the pressure-relieving lip 50 can be separated from the outer peripheral face of the second mounting member 14 so that a state of communication between the fluid chamber 52 and the outside can be stably maintained via the pressure-relieving groove 64.

In the engine mount 10 with the structure according to the present embodiment formed as described above, the pressure-relieving lip 50 is formed to protrude from the sealing rubber layer 44 fixed to the inner peripheral face of the tubular fitting member 28. Then, in the process of externally fitting the tubular fitting member 28 onto the second mounting member 14 and fixing it in place by the drawing operation, the pressure-relieving lip 50 is pressed against the outer peripheral face of the second mounting member 14 in the initial stage of the drawing operation to depress the sealing rubber layer 44 on both sides of the pressure-relieving lip 50. This allows the pressure-relieving groove 64 opening to the inner peripheral face of the sealing rubber layer 44 to be formed to extend along the pressure-relieving lip 50 on both sides thereof so that the space between the opposing faces of the main rubber elastic body 16 and the flexible film 26 (fluid chamber 52) is communicated with the outside (in the water tank filled with a non-compressible fluid) via the pressure-relieving groove 64. Therefore, the liquid pressure rise in the fluid chamber 52 due to the diameter constriction of the tubular fitting member 28 is mitigated to prevent relative tilting and positional deviation in the axial direction and the like between the second mounting member 14 and the tubular fitting member 28.

Especially by forming the protruded pressure-relieving lip 50 and pressing it against the outer peripheral face of the second mounting member 14 rather than forming a concave groove in advance on the sealing rubber layer 44, the pressure-relieving groove 64 is created on the sealing rubber layer 44. Therefore, in the initial stage of the drawing operation when the amount of diameter-constricting deformation of the tubular fitting member 28 is kept under a given value, the pressure-relieving groove 64 expands rather than contracts as the amount of diameter-constricting deformation of the tubular fitting member 28 increases, thus effectively mitigating a rise in the fluid pressure of the fluid chamber 52.

Further, in the present embodiment, four pressure-relieving lips 50 are formed, each of which is provided with the pressure-relieving groove 64 formed on both sides thereof. Therefore, the internal pressure rise of the fluid chamber 52 is mitigated more effectively by the eight pressure-relieving grooves 64 and the second mounting member 14 and the tubular fitting member 28 are assembled to each other at a proper relative position so that the intended performance can be obtained in a stable manner. Moreover, in the present embodiment, since the four pressure-relieving lips 50 are arranged in equal distribution along the circumference, a reaction force against the abutment between the four pressure-relieving lips 50 and the outer peripheral face of the second mounting member 14 is exerted in the direction of offsetting in a good balance on the circumference, thus preventing the second mounting member 14 from tilting relative to the tubular fitting member 28 due to the abutting reaction force.

Moreover, the pressure-relieving lip 50 has a ratio (h/w) of its protrusion height (h) to width (w) in the range of 0.5≤h/w≤1.5. According to this, the pressure-relieving lip 50 is abutted against the outer peripheral face of the second mounting member 14 so that the pressure-relieving groove 64 is formed with a large enough cross-sectional area, thus effectively mitigating a rise in the internal pressure of the fluid chamber 52.

In addition, since the pressure-relieving lip 50 is fainted in a length reaching the bottom end of the sealing rubber layer 44, the pressure-relieving groove 64 is formed from the bottom end of the sealing rubber layer 44 during the drawing operation on the fitting portion 34 of the tubular fitting member 28 starting from below so that the fluid chamber 52 is kept in communication with the outside in a more stable manner.

Also, once the amount of diameter-constricting deformation of the tubular fitting member 28 is made large enough as the drawing operation progresses, the sealing rubber layer 44 is compressed in the radial direction between the second mounting member 14 and the tubular fitting member 28 to seal the space between them in a fluid-tight way. This prevents the non-compressible fluid sealed in the fluid chamber 52 from leaking out through the space between the superposed faces of the second mounting member 14 and the tubular fitting member 28 at the completion of the drawing operation whereas the pressure-relieving groove 64 is formed on the sealing rubber layer 44 in the initial stage of the drawing operation, which enables to obtain the intended vibration damping performance in a stable manner.

Further, in the present embodiment, the seal lip 48 is formed on the sealing rubber layer 44 to protrude therefrom, and by having the seal lip 48 abutted continuously against the outer peripheral face of the second mounting member 14 about the entire circumference, the space between the superposed faces of the second mounting member 14 and the fitting portion 34 of the tubular fitting member 28 is sealed more tightly. In addition, since the protrusion tip of the seal lip 48 is positioned aside to the outer peripheral side of the virtual circle passing through the protrusion tip of the pressure-relieving lip 50, the seal lip 48 would not abut against the outer peripheral face of the second mounting member 14 until the pressure-relieving lip 50 does so, thus effectively adjusting the amount of fluid sealed in the fluid chamber 52 by the fluid flow through the pressure-relieving groove 64.

Moreover, the seal lip 48 is arranged above the portion where the pressure-relieving groove 64 is formed on the sealing rubber layer 44, and by having the seal lip 48 abutted against the outer peripheral face of the second mounting member 14, the fluid chamber 52 is shut out from the outside by the seal lip 48, even if the pressure-relieving groove 64 still remains. Therefore, there is no need to compress the sealing rubber layer 44 until the pressure-relieving groove 64 disappears, which enables to secure the tightness of the fluid chamber 52 with a relatively small amount of diameter-constricting deformation of the tubular fitting member 28.

In addition, since the seal lip 48 is arranged above the pressure-relieving lip 50 separated therefrom, it is hard for the seal lip 48 to block the fluid flow through the pressure-relieving groove 64 in the initial stage of the drawing operation when the amount of diameter constriction of the tubular fitting member 28 is still small, thus effectively preventing any rise in the internal pressure of the fluid chamber 52 in the assembly process.

Also, the fitting portion 34 of the tubular fitting member 28 is made in a tapered tubular shape that expands upward, while the upper portion of the inner peripheral face of the sealing rubber layer 44 fixed to the fitting portion 34 is also made in a tapered shape that expands upward. This allows the second mounting member 14 in an approximate shape of a cylinder extending vertically with almost a constant cross-section to be guided toward the center in the radial direction along the inner periphery of the fitting portion 34 and the sealing rubber layer 44 and easily inserted therein.

In addition, since the top face of the sealing rubber layer 44 is made into the guiding face 46 in a tapered shape sloping down peripherally inward, the second mounting member 14 is guided toward the inner periphery by being abutted against the guiding face 46 so as to be easily inserted into the inner periphery of the fitting portion 34 and the sealing rubber layer 44.

Embodiments of the present invention have been described in detail above, but the present invention is not limited to those specific descriptions. For example, the number of formations of the pressure-relieving lip and the arrangement thereof in the circumferential direction of the second mounting member and the tubular fitting member or the like are just examples and not particularly limited.

Also, in the embodiments described above, the inner peripheral face of the sealing rubber layer 44 extends about the entire circumference with almost a constant cross-section, and no particular concave/convex portions or the like are provided on the surface on either side of the pressure-relieving lip 50, but for example, a concave groove can be formed in advance on both sides of the pressure-relieving lip 50 in the width direction on the sealing rubber layer 44 that opens up peripherally inward and extends along the pressure-relieving lip 50. According to this, the cross-sectional area of the pressure-relieving groove 64 formed along the pressure-relieving lip 50 can be secured large enough in the initial stage of the abutment of the pressure-relieving lip 50 against the second mounting member 14 when the amount of deformation by depression of the sealing rubber layer 44 is still small, thus favorably preventing the inner pressure of the fluid chamber 52 from rising.

Specific configuration of the pressure-relieving lip 50 should not be interpreted in a limited manner according to the embodiments described above, but for example, the pressure-relieving lip can extend while being entirely or partially inclined in the circumferential direction.

Also, the sealing rubber layer can be fixed to the outer peripheral face of the second mounting member 14, in which case the sealing rubber layer can be integrally formed with the main rubber elastic body 16. In addition, the sealing rubber layer can be provided both on the outer peripheral face of the second mounting member 14 and the inner peripheral face of the tubular fitting member 28.

Also, the sealing rubber layer 44 can be integrally formed with the flexible film 26. That is, the sealing rubber layer 44 is integrally formed with the flexible film 26, for example by forming the sealing rubber layer 44 and the bunging rubber layer 40 being connected to each other on the step portion 32.

Also, the fitting portion 34 of the tubular fitting member 28 to which the sealing rubber layer 44 is fixed is preferably in a tapered shape that expands toward the opening of the second mounting member 14 on the insertion side, but it can also be in a tubular shape extending straightly with almost a constant cross-section.

In the case where enough sealability is secured by the sealing rubber layer 44, for example, the seal lip 48 is not essential and can be omitted. Also, in the structure where the sealing rubber layer 44 and the pressure-relieving lip 50 are provided on the inner peripheral face of the tubular fitting member 28, an annular-shape seal lip can be formed to protrude out from the outer peripheral face of the second mounting member 14.

In the embodiments described above, an example of the present invention is shown as applied to a passive-type vibration damping device that can exert passive vibration damping effect against a vibration input, but the present invention can be applied, for example, to an active-type vibration damping device that can offset and attenuate the vibration input in an active manner by exciting and driving an oscillation member that partially constitutes the wall of the fluid chamber 52 with an electromagnetic or pneumatic actuator. None of the flexible film, partition member, nor the orifice passage are essential, and the tubular fitting member is not limited to being fixed to the flexible film.

The applicable range of the present invention is not limited to the engine mount but can be preferably expanded to the sub-frame mount, body mount, and differential mount and so forth. Also, the present invention is not only applicable to the fluid-filled vibration damping device for automobiles, but is also applicable to the fluid-filled vibration damping device for motorcycles, railroad cars, industrial vehicles and the like.

What is claimed is:
1. A fluid-filled vibration damping device comprising:
   a first mounting member;
   a tubular second mounting member;
   a main rubber elastic body elastically connecting the first and second mounting members;
   a tubular fitting member externally slipped around the second mounting member that is fixed to an outer peripheral face of the main rubber elastic body, the tubular fitting member being drawn and externally fitted onto the second mounting member in a fluid-tight manner so as to provide a fluid chamber whose wall is partially constituted by the main rubber elastic body and which is filled with a non-compressible fluid;
   a sealing rubber layer fixed to at least one of an outer peripheral face of the second mounting member and an inner peripheral face of the tubular fitting member so as to be compressed between the second mounting member and the tubular fitting member about an entire circumference; and
   at least one pressure-relieving lip protruding from the sealing rubber layer and extending toward openings of the second mounting member and the tubular fitting member so as to be pressed against one of the outer peripheral face of the second mounting member and the inner peripheral face of the tubular fitting member in a direction of protrusion,
   wherein the at least one pressure-relieving lip comprises a plurality of pressure-relieving lips that are spaced apart from each other in a circumferential direction of the second mounting member and the tubular fitting member, and
   wherein each of the plurality of pressure-relieving lips has, from its bottommost portion to its topmost portion closest to the opening of the tubular fitting member, a protrusion height from the sealing rubber layer that gradually increases.

2. The fluid-filled vibration damping device according to claim 1, wherein the at least one pressure-relieving lip extends in an axial direction of the tubular fitting member around the second mounting member.

3. The fluid-filled vibration damping device according to claim 1, further comprising an annular-shape seal lip protruding from the sealing rubber layer and extending in the circumferential direction of the second mounting member and the tubular fitting member.

4. The fluid-filled vibration damping device according to claim 1, further comprising:
   a flexible film that closes the opening of the tubular fitting member fluid-tightly so as to provide the fluid chamber between the main rubber elastic body and the flexible film;
   a partition member arranged in the fluid chamber to have its outer peripheral face supported by the tubular fitting member, the fluid chamber being divided into two parts by the partition member so as to form a pressure-receiving chamber whose wall is partially constituted by the main rubber elastic body and an equilibrium chamber whose wall is partially constituted by the flexible film respectively on both sides across the partition member; and
   an orifice passage that interconnects the pressure-receiving chamber and the equilibrium chamber.

5. A method of manufacturing a fluid-filled vibration damping device, the method comprising:
   a main rubber body forming process in which a first mounting member and a second mounting member prepared in advance are elastically connected by a main rubber elastic body to obtain an integrally vulcanization molded component of the main rubber elastic body incorporating the first and second mounting members;
   a sealing rubber forming process in which a sealing rubber layer is formed so as to cover at least one of an outer peripheral face of the second mounting member and an inner peripheral face of a tubular fitting member prepared in advance, the sealing rubber layer being provided with a plurality of pressure-relieving lips that are spaced apart from each other in a circumferential direction of the second mounting member and the tubular fitting member, each of the pressure relieving lips protruding from the sealing rubber layer and extending toward openings of the second mounting member and the tubular fitting member;

an assembly process in which the tubular fitting member is externally slipped around the second mounting member of the integrally vulcanization molded component of the main rubber elastic body and subjected to a drawing operation within a non-compressible fluid so as to provide a fluid chamber with the non-compressible fluid sealed therein, and the tubular fitting member is externally fitted onto the second mounting member while the plurality of pressure-relieving lips are pressed against one of the second mounting member and the tubular fitting member in a direction of protrusion so that the sealing rubber layer is depressed on both sides of the pressure-relieving lips and the fluid chamber communicates with an outside; and a sealing process in which the tubular fitting member is further constricted in diameter and the sealing rubber layer is compressed between the second mounting member and the tubular fitting member so as to provide a fluid-tight sealing between superposed faces of the second mounting member and the tubular fitting member to completely close the fluid chamber, wherein each of the plurality of pressure-relieving lips has, from its bottommost portion to its topmost portion closest to the opening of the tubular fitting member, a protrusion height from the sealing rubber layer that gradually increases.

6. The method of manufacturing the fluid-filled vibration damping device according to claim 5, wherein in the assembly process, the tubular fitting member having a tapered tubular shape that expands toward one open end is externally slipped around the second mounting member that extends straightly in a tubular shape from a side of the one open end.

7. The fluid-filled vibration damping device according to claim 1, wherein a ratio (h/w) of the protrusion height (h) of the at least one pressure-relieving lip to a width (w) of the at least one pressure-relieving lip is set in a range of $0.5 \leq h/w \leq 1.5$.

8. The fluid-filled vibration damping device according to claim 1, wherein the plurality of pressure-relieving lips are spaced apart from each other by nearly equal amounts in the circumferential direction.

9. The fluid-filled vibration device according to claim 1, wherein:

at a middle in the axial direction thereof, the tubular fitting member has an annular-shape step portion so that one axial side of the tubular fitting member extending from the step portion to the opening is a fitting portion that has a diameter larger than another axial side of the tubular fitting member, the sealing rubber layer is disposed between the outer peripheral face of the second mounting member and an inner peripheral face of the fitting portion, and the second mounting member and the step portion of the tubular fitting member directly abut by being placed on each other in the axial direction.

10. The fluid-filled vibration damping device according to claim 3, wherein the seal lip is arranged closer to the opening of the tubular fitting member than the at least one pressure-relieving lip.

11. The fluid-filled vibration damping device according to claim 1, wherein a protrusion tip spanning from the bottommost portion of each of the pressure-relieving lips to the topmost portion is at a constant distance from the axis of the tubular fitting member.

* * * * *